United States Patent [19]
Orzel et al.

[11] Patent Number: 5,325,836
[45] Date of Patent: Jul. 5, 1994

[54] FLEXIBLE FUEL CONTROL SYSTEM WITH FUEL TRANSIT DELAY COMPENSATION

[75] Inventors: Daniel V. Orzel, Westland; William E. Boruta, Dearborn; Judith M. Curran, Northville, all of Mich.

[73] Assignee: Ford Motor Company, Dearborn, Mich.

[21] Appl. No.: 971,749

[22] Filed: Nov. 5, 1992

[51] Int. Cl.⁵ ............................................. F02M 51/00
[52] U.S. Cl. .................................... 123/478; 123/1 A
[58] Field of Search ............... 123/478, 1 A, 480, 494

[56] References Cited

U.S. PATENT DOCUMENTS

| | | | |
|---|---|---|---|
| 4,706,629 | 11/1987 | Wineland et al. | 123/478 |
| 4,913,099 | 4/1990 | Ota | 123/478 |
| 4,922,862 | 5/1990 | Casacci | 123/478 |
| 4,945,881 | 8/1990 | Gonze et al. | 123/1 A |
| 4,969,439 | 11/1990 | Scotson | 123/478 |
| 5,183,021 | 2/1993 | Suga et al. | 123/478 |
| 5,239,860 | 8/1993 | Harris et al. | 123/1 A |

Primary Examiner—Raymond A. Nelli
Attorney, Agent, or Firm—Allan J. Lippa; Roger L. May

[57] ABSTRACT

An electronic engine control system for use with differing fuel types, such as gasoline, methanol and mixtures of the two, controls engine operating parameters such as the fuel/air ratio and ignition timing in response to fuel-type indications generated by a fuel type sensor positioned on the fuel line. Changes in the fuel type passing the sensor result in variations in the engine control signals which are effective after a variable delay period elapses. The duration of the variable delay period is altered in response to changes in fuel pump voltage and fuel temperature to form a better estimate of the transport delay experienced by the fuel as it passed from the fuel-type sensor to the engine's fuel intake. A microcontroller delays the control signal changes by retrieving a count value from a two-dimensional lookup table indexed by values reflecting pump voltage and fuel temperature. The count value is placed in a countdown timer which is decremented to zero for establishing a subinterval, at the conclusion of which the current fuel type signal is pushed into a FIFO stack as the oldest stored fuel type value is popped from the stack and supplied to the engine controller. In this way, the stack operates as a variable duration delay device which is updated at the end of subintervals each having a duration dependent upon the estimated fuel transport delay.

6 Claims, 1 Drawing Sheet

FLEXIBLE FUEL CONTROL SYSTEM WITH FUEL TRANSIT DELAY COMPENSATION

FIELD OF THE INVENTION

This invention relates generally to variable time delay mechanisms and more particularly, although in its broader aspects not exclusively, to an arrangement for compensating for the fuel transit delays in a variable-fuel control system.

BACKGROUND OF THE INVENTION

Modern automotive engines include electronic engine controls which vary operating parameters of the engine, such as air-fuel ratios and ignition timing, to achieve optimum performance. Such control systems are capable of changing engine operating parameters in response to a variety of external conditions.

Engines designed to operate efficiently with different fuels, or a mixture of different fuels, utilize electronic engine control systems to change the engine operating parameters in response to the type of fuel being delivered to the engine. Such systems utilize a sensor to detect the type of fuel being delivered to the engine and an electronic engine control to vary the operating parameters accordingly. One such system is disclosed in U.S. Pat. No. 4,706,629 issued to Wineland et al.

The time required for the sensor to transmit the fuel-type indication, and the time required by the electronic engine control to change the engine operating parameters in response to that indication, are invariably shorter than the time required for the fuel itself to travel from the sensor to the engine. If the sensor is located away from the engine, for instance near the fuel tank, the engine operating parameters will be changed by the engine control system for the new fuel-type before the new fuel has arrived at the engine. This can result in poor performance and combustion efficiency until the conforming fuel reaches the engine. This problem is particularly acute when the fuel in the tank stratifies. Stratification can occur, for instance, in cold weather when the tank contains a mixture of gasoline and methanol. Under these conditions, the fuel pump will pick up different layers of the fuel at different times, the sensor will detect the change in the fuel, and the engine operating parameters will be changed before the detected fuel reaches the engine. As a result, the engine will suffer a temporary loss of performance and efficiency because of the disparity between the engine operating parameters and the fuel being utilized.

SUMMARY OF THE INVENTION

It is an object of the present invention to synchronize the changing of engine operating parameters with the arrival of the corresponding fuel at the engine. In accordance with a principal feature of the invention, the time required for the fuel to travel from the fuel-type sensor to the engine is estimated and taken into account in the generation of the engine operating parameters.

In accordance with a first feature of the invention, a digital signal processor is used to produce a digital value representing the estimated transit time of the fuel, and timing means responsive to this digital value are employed to delay the effect of changes in the fuel-type as detected by the fuel-type sensor by the estimated transit time.

According to another feature of the invention, the digital value representing the estimated transit time is varied in response to changes in the fuel temperature and in response to changes in the voltage powering the fuel pump. An addressable digital memory array stores a sequence of values which indicate expected delay durations under different engine operating conditions, and a value indicative of the estimated delay duration is periodically retrieved from the memory array based on the currently sensed fuel temperature and pump supply voltage.

According to a further feature of the invention, a plural storage cell, first-in, first-out (FIFO) stack is used to store digital values indicating previously sensed fuel-types during the estimated delay interval. The addressable array stores count values which are periodically loaded into a counter-timer which is decremented at a uniform rate, generating a timing signal at the conclusion of subintervals having durations equal to the estimated transit delay divided by the number of cells in the stack. In response to each such timing signal, the oldest fuel-type value is popped from the stack and a new fuel-type value from the fuel-type sensor is pushed into the stack. Each popped value is accordingly delayed by an estimate of the fuel transit time, and thus alters the engine's operating parameters at the time at which the sensed fuel is expected to arrive at the engine's fuel intake system.

These and other objects, features and advantages of the invention may be more clearly understood by considering the following detailed description. In the course of this description, reference will frequently be made to the attached drawings, in which:

DETAILED DESCRIPTION

Figure 1:
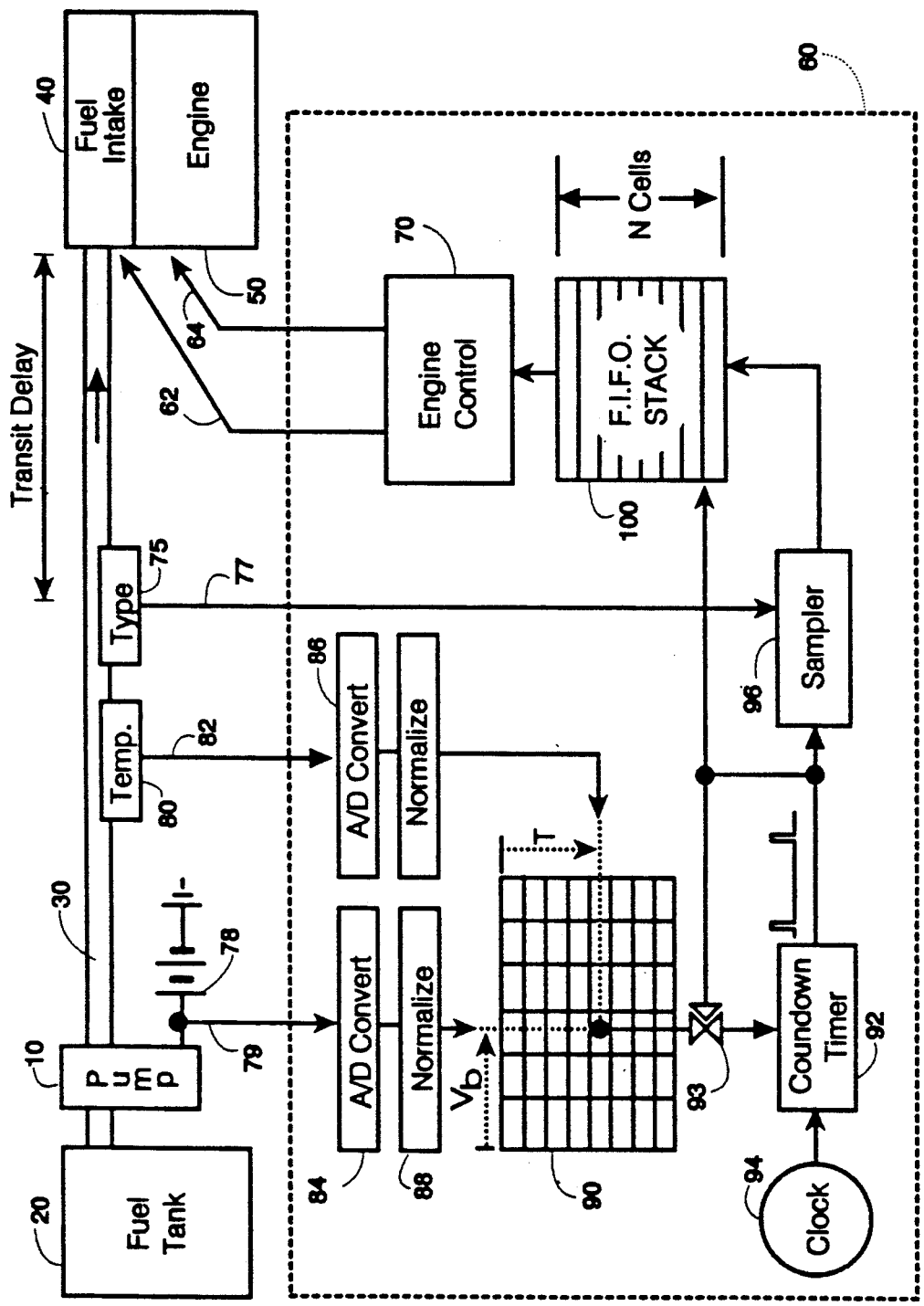
FIG. 1 is a schematic block diagram of an automotive fuel delivery system and electronic engine control system which embodies the invention.

FIG. 1 of the drawings shows a system which embodies the principles of the invention. A fuel pump 10 propels fuel from a fuel tank 20 through a fuel line 30 to the fuel intake 40 of an internal combustion engine 50. The fuel intake system 40 typically includes electronic fuel injectors (not shown) for controlling the amount of fuel supplied to the engine as well as the air/fuel mixture (richness).

The engine 50 and its fuel intake system 40 operate under the control of an electronic engine control system which includes a microcontroller which implements the functions indicated within the dashed-line rectangle 60 in FIG. 1. The microcontroller 60 supplies signals via line 62 to the fuel intake system 40 to control both amount of fuel and the air/fuel mixture delivered to the engine. Further control signals are supplied via line 64 to the engine 50 to control the engine's ignition timing. The control signals supplied via lines 62 and 64 are produced by engine control routines, indicated at 70 in FIG. 1, which are executed by the microcontroller 60 to process a variety of signals indicating engine operating conditions in order to optimize the engine's performance.

Automotive engine control systems often include several microcontrollers, such as the microcontroller 60 seen in FIG. 1, each of which is implemented by one or more integrated circuits to provide a processor, a read-only memory (ROM) which stores the programs executed by the processor and configuration data, peripheral data handling circuits, and a random access read/write "scratchpad" memory for storing dynamically changing data. These microcontrollers typically include built-in analog-to-digital conversion capabilities useful for translating analog signals from sensors and the like into digitally expressed values, as well as timer/counters for generating timed interrupts. Such microcontrollers are available from a variety of sources and include the Motorola 6800 family of devices which are described in detail in *Motorola's Microprocessor and Microcontroller Families*, Volume 1 (1988), published by Motorola, Inc., Microcontroller Division, Oak Hill, Tex.

The embodiment of the invention shown in FIG. 1 is particularly useful in a flexible fuel system in which the electronic engine control system includes a fuel-type sensor 75 which senses the type of fuel being burned and generates a fuel-type signal which is supplied via line 77 to the microcontroller 60 which in turn alters the engine's operating parameters to accommodate a variety of fuels, such as conventional gasoline, an alcohol-based fuel, or a mixture of the two.

In accordance with a feature of the invention, the microcontroller 60 also processes input information which specifies the magnitude of the voltage applied to the fuel pump 10 as well as the temperature of the fuel flowing in fuel line 30, and then employs these voltage and temperature values to generate an estimate of the time required to transport the fuel between the fuel-type sensor 75 and the fuel intake 40.

The fuel-type sensor 75 is positioned on fuel line 30 at a location remote from the engine's fuel intake system 40. As a consequence, the fuel-type signal from sensor 75 arrives at the microcontroller 60 at a time substantially earlier than the time at which the sensed fuel arrives at the fuel intake 40. It is therefore desirable to delay the effect of the sensed fuel type signal until the fuel itself arrives at the engine intake 40. The duration of the fuel transit time varies substantially as fuel temperature (and hence viscosity) varies between cold winter startup and hot summer driving conditions. Moreover, the battery voltage supplied to the pump 10 may vary significantly, altering the pump's output fuel pressure and the fuel flow rate. In accordance with the invention, the sensed fuel temperature and fuel pump voltage magnitudes are employed to generate a digital value indicative of the current estimated fuel transit delay.

The fuel pump 10 is powered by a battery 78, and the voltage supplied to the pump from battery 78 is communicated via conductor 79 to an input port of the microcontroller 60. A temperature sensor 80 is positioned in thermal contact with the fuel flowing through fuel line 30 and transmits a signal indicating the temperature of the fuel flowing in fuel line 30 to the microcontroller 60 via line 82.

The microcontroller advantageously employs analog-to-digital conversion means, indicated at 84 and 86, for converting the pump voltage and fuel temperature signals respectively into digital form. The battery voltage signal is normalized as indicated at 88 such that pump voltages in a range extending from about 6.0 to 14.0 volts are converted into integer index values 0 to 5 seen at $V_b$ in FIG. 1. Similarly, the digital value from A/D converter 86 which represents fuel temperature in a range from $-40$ to $+254$ degrees fahrenheit is normalized at 87 into an integer index value 0 to 7 indicated at T in FIG. 1. The pump voltage and fuel temperature index values $V_b$ and T are then used to select the column and row positions respectively of a $6 \times 8$ read-only array 90 which holds 48 predetermined count values, one of which is addressed and selected by each combination of fuel temperature and pump voltage.

The addressed count value from array 90 is loaded into a countdown timer 92 via a gate 93 to begin each sub-interval, which terminates when the count loaded into the countdown timer 92 is decremented to zero by a signal from a clock 94. The counts stored in the array 90 are preselected (based on measured transit time values) such that the countdown timer will decrement to zero from the loaded value at the end of a subinterval duration which is 1/Nth of the estimated fuel transit time for the sensed fuel temperature and fuel voltage. In this way, the fuel-type signals from fuel-type sensor 75 are sampled as seen at 96 at the end of each subinterval and the resulting samples are stored, in digital form, in the N-cell first-in, first-out (F.I.F.O.) stack 100.

Thus, as seen in FIG. 1, the timing signals appearing at the output of countdown timer 92 at the end of each subinterval cause the oldest value in the stack to be supplied to the engine control 70 for controlling the engine and, concurrently, supply a new fuel type sample signal via sampler 96 to the stack 100 and reload the counter timer 92 via the gate 93.

The stack 100 operates as a variable duration delay device which accepts digital values from the sampler 96 and delivers each given sample value at the end of a variable delay duration which is altered to reflect changes in the estimated fuel transit delay values represented by the count values read into countdown timer 92 from the lookup table 90. In accordance with the invention, this variable delay function is achieved with a fixed length stack using only instrumentalities already available in the microcontroller and sensor mechanisms used for other engine control functions, and consequently can be added to enhance the operation of the engine control system at little additional cost.

It is to be understood that the specific arrangement which has been described is merely illustrative of one application of the principles of the invention. Numerous modifications may be made by those skilled in the art without departing from the true spirit and scope of the invention.

We claim:

1. In combination,
   an internal combustion engine having a fuel intake mechanism which is responsive to a control signal,
   a fuel tank,
   a fuel line for transporting fuel from said tank to said intake mechanism,
   a fuel-type sensor positioned on said fuel line and spaced from said intake mechanism for generating a fuel-type signal indicative of the type of fuel flowing past said sensor,
   means for generating a numerical estimate of the transit time required for fuel to flow from said sensor to said intake mechanism,
   air/fuel mixture control means for generating said control signal in response to said fuel-type signal, and
   and delay means connecting said sensor to said air/fuel mixture control means for delaying said fuel-type signal by a delay interval having a duration corresponding to said numerical estimate.

2. The combination set forth in claim 1 wherein said means for generating said numerical estimate comprises, in combination, an electrically-operated fuel pump for propelling fuel though said fuel line, means for measuring the voltage applied to said pump, and means for varying the value of said estimated transit time in response to variations in said voltage.

3. The combination set forth in claim 2 wherein said means for generating said numerical estimate further comprises, in combination, means for measuring the temperature of said fuel line and means for varying the value of said estimated transit time in response to variations in said temperature.

4. Apparatus for delaying a time-varying digitally-expressed input variable by a duration established by a varying digital duration control value, comprising in combination:
 counter means for storing said varying digital duration control value;
 decrementing means for decrementing said counter at a fixed rate;
 means responsive to said decrementing means for generating a timing signal each time the value stored in said counter is decremented to zero;
 a first-in, first-out stack comprising a predetermined number of storage cells;
 means for storing a current value of said time-varying digital input variable in said stack upon each occurrence of said timing signal;
 means for removing from said stack the least recently stored one of said variables upon each occurrence of said timing signal, said least recently stored one of said variables being a delayed replica of said input variable.

5. The method of claim 4 wherein said input variable indicates the type of fuel passing through a fuel line at a sensing position spaced from the fuel intake of an internal combustion engine and wherein said duration control value represents the estimated time duration required to transport said fuel from said sensing position to said engine.

6. A method for controlling an engine, the method comprising the steps of:
 supplying fuel to said engine via a fuel supply line, said fuel having a variable type and a variable temperature;
 generating a first control signal indicative of the temperature of said fuel;
 generating a second control signal indicative of a characteristic of said fuel at a sensing position on said fuel supply line;
 generating an estimate of the time required to transport fuel from said sensing position to said engine based on the current value of said first control signal,
 generating an engine control signal in response to said second control signal, said engine control signal manifesting changes at times delayed from changes manifested by said second control signal by a delay interval having a duration corresponding to said estimate.

* * * * *